US012792673B2

(12) United States Patent
Hore et al.

(10) Patent No.: US 12,792,673 B2
(45) Date of Patent: Nov. 10, 2026

(54) LLM-BASED CONTEXT RETRIEVAL ENSURING HIGH CONSISTENCY, PRECISION AND RECALL

(71) Applicant: Wipro Limited, Bangalore (IN)

(72) Inventors: Prodip Hore, Bangalore (IN); Gopichand Agnihotram, Bangalore (IN); Neti Theertha Bhaskara Sri Sai, Bengaluru (IN); Y Siddartha Reddy, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 19/207,679

(22) Filed: May 14, 2025

(65) Prior Publication Data

US 2026/0300410 A1 Oct. 1, 2026

(30) Foreign Application Priority Data

Mar. 28, 2025 (IN) ............................ 202541030215

(51) Int. Cl.
*G06F 16/93* (2019.01)

(52) U.S. Cl.
CPC .................................... *G06F 16/93* (2019.01)

(58) Field of Classification Search
None
See application file for complete search history.

(56) References Cited

U.S. PATENT DOCUMENTS

| | | | | |
|---|---|---|---|---|
| 12,511,322 | B1 * | 12/2025 | Zhang | G06F 16/3347 |
| 2023/0409614 | A1 | 12/2023 | Hamilton et al. | |
| 2025/0068666 | A1 * | 2/2025 | Maheshwari | G06F 16/335 |
| 2025/0298798 | A1 * | 9/2025 | Kane | G06F 16/24542 |
| 2025/0315486 | A1 * | 10/2025 | Dar | G06F 16/93 |
| 2025/0348483 | A1 * | 11/2025 | Malvar Maua | G06F 16/3329 |
| 2026/0030289 | A1 * | 1/2026 | Spasojevic | G06F 16/535 |
| 2026/0030450 | A1 * | 1/2026 | Ramezani | G06F 16/33 |
| 2026/0030480 | A1 * | 1/2026 | Gong | G06F 16/90 |

OTHER PUBLICATIONS

[@vijaymohire], "Question Answering with Large Documents", GitHub, March 10, 2024, 15 pages, github.com/vijaymohire/generative-ai/blob/main/question_answering_documents.ipynb.

(Continued)

*Primary Examiner* — Son T Hoang
(74) *Attorney, Agent, or Firm* — Finnegan, Henderson, Farabow, Garrett & Dunner, LLP

(57) ABSTRACT

The method for context retrieval in large dataset using an LLM. The method includes receiving, via a user interface, a set of documents and a user query for an LLM. The method further includes calculating, for each of the set of documents, a combined relevancy score corresponding to the user query. The method further includes selecting a set of relevant documents for the user query from the set of documents based on the combined relevancy score and a predefined threshold relevancy score. The method further includes creating a set of vector indices from the set of relevant documents. The method further includes retrieving a set of relevant document chunks from a first vector index based on a similarity analysis between each of the set of vector indices and the user query.

13 Claims, 8 Drawing Sheets

(56) References Cited

OTHER PUBLICATIONS

Laforge et al., "Summarization Techniques, Iterative Refinement and Map-Reduce for Document Workflows", Google Cloud Blog, Apr. 30, 2024, 8 pages, cloud.google.com/blog/products/ai-machine-learning/long-document-summarization-with-workflows-and-gemini-models.
"Smart Disambiguation on Retrieved Documents in a Conversational Search System", The IP.com Journal, Nov. 8, 2024, 6 pages.
Hritsai, "How to Build an Effective Conversational Search", UnidataLab, Sep. 21, 2023, 15 pages, unidatalab.com/how-to-build-an-effective-conversational-search/.
Nguyen, "9 Methods to Enhance the Performance of a LLM RAG Application", Medium, Nov. 19, 2023, 15 pages, medium.com/9-methods-to-enhance-the-performance-of-a-llm-rag-application-3bedfd0842e1.
Trabelsi et al., "Neural ranking models for document retrieval", Information Retrieval Journal, Springer Nature, Oct. 19, 2021, vol. 24, 45 pages, https://doi.org/10.1007/s10791-021-09398-0.
Wehnert et al., "Legal Norm Retrieval with Variations of the BERT Model Combined with TF-IDF Vectorization", ICAIL '21: Proceedings of the Eighteenth International Conference on Artificial Intelligence and Law, Association for Computing Machinery, 10 pages, Jul. 27, 2021, https://doi.org/10.1145/3462757.3466104.
"Ensemble Retrieval Guide", Llamaindex.ai, Llamalndex, 2021, 8 pages, docs.llamaindex.ai/en/stable/examples/retrievers/ensemble_retrieval/.

* cited by examiner

500

| L-Index 502 | S-Index 504 |
|---|---|
| Chunk 1 (10K tokens) | Chunk 1 (1K tokens) |
| | Chunk 2 (1K tokens) |
| | Chunk 3 (1K tokens) |
| | Chunk 4 (1K tokens) |
| | Chunk 5 (1K tokens) |
| | Chunk 6 (1K tokens) |
| | Chunk 7 (1K tokens) |
| | Chunk 8 (1K tokens) |
| | Chunk 9 (1K tokens) |
| | Chunk 10 (1K tokens) |
| Chunk 2 (10K tokens) | Chunk 11 (1K tokens) |
| | Chunk 12 (1K tokens) |
| | Chunk 13 (1K tokens) |
| | Chunk 14 (1K tokens) |
| | Chunk 15 (1K tokens) |
| | Chunk 16 (1K tokens) |
| | Chunk 17 (1K tokens) |
| | Chunk 18 (1K tokens) |
| | Chunk 19 (1K tokens) |
| | Chunk 20 (1K tokens) |
| Chunk 3 (10K tokens) | Chunk 21 (1K tokens) |
| | Chunk 22 (1K tokens) |
| | Chunk 23 (1K tokens) |
| | Chunk 24 (1K tokens) |
| | Chunk 25 (1K tokens) |
| | Chunk 26 (1K tokens) |
| | Chunk 27 (1K tokens) |
| | Chunk 28 (1K tokens) |
| | Chunk 29 (1K tokens) |
| | Chunk 30 (1K tokens) |

FIG. 5

LLM-BASED CONTEXT RETRIEVAL ENSURING HIGH CONSISTENCY, PRECISION AND RECALL

TECHNICAL FIELD

This disclosure relates generally to Large Language Model (LLM), and more particularly to method and system for context retrieval in large dataset using LLM.

BACKGROUND

Retrieval Augmented Generation (RAG) is a technique to increase the accuracy and reliability of Generative AI (GenAI) models such as Large Language Models (LLMs). The RAG may enable the LLMs to interact with external data not used during training. This may help users to interact with any data source through the LLM using a traditional RAG pipeline. However, the traditional RAG pipeline has several limitations, such as dependence on quality and relevance of the retrieved embedding data, stochastic nature of output, reliance on a retrieval mechanism to fetch external data corresponding to queries, providing inconsistent outputs, inability to process long-context queries efficiently, and consequent inaccuracy of generated responses.

Recently, novel model architectures have been introduced in the LLMs, promoting sparsity, recurrence, conditional computations, to handle long contexts better. However, existing RAG-based techniques fail to leverage such architectures for creating better chatbots or information retrieval systems. In the present state of art, traditional systems for document retrieval and response generation primarily rely on techniques like Term Frequency-Inverse Document Frequency (TF-IDF) for keyword relevance scoring. TF-IDF may be an effective approach for larger documents, but may struggle with shorter documents due to heavy reliance on word frequency. Additionally, TF-IDF may fail to understand semantic aspect as in embedding space. This makes TF-IDF less effective in contexts where the richness of meaning comes from the sentence structure and semantic relationships, rather than the raw frequency of words.

The present invention is directed to overcome one or more limitations stated above or any other limitations associated with the known arts.

SUMMARY

In one embodiment, a method for context retrieval in large dataset using Large Language Model (LLM) is disclosed. In one example, the method may include receiving, via a user interface, a set of documents and a user query for an LLM. For each of the set of documents, the method may further include calculating a combined relevancy score corresponding to the user query. It should be noted that the combined relevancy score is a weighted sum of a semantic score and a keyword score of each of the set of documents corresponding to the user query. The method may further include selecting a set of relevant documents for the user query from the set of documents based on the combined relevancy score and a predefined threshold relevancy score. The method may further include creating a set of vector indices from the set of relevant documents. It should be noted that each of the set of vector indices may include embeddings based on a plurality of document chunks of a predefined size. The method may further include retrieving a set of relevant document chunks from a first vector index based on a similarity analysis between each of the set of vector indices and the user query. It should be noted that the first vector index is one of the set of vector indices. It should also be noted that the predefined size of each of the plurality of document chunks of the first vector index is greater than the predefined size of each of the plurality of document chunks of each of remaining of the set of vector indices.

In another embodiment, a system for context retrieval in large dataset using an LLM is disclosed. In one example, the system may include a processor and a computer-readable medium communicatively coupled to the processor. The computer-readable medium may store processor-executable instructions, which, on execution, may cause the processor to receive, via a user interface, a set of documents and a user query for an LLM. For each of the set of documents, the processor-executable instructions, on execution, may further cause the processor to calculate a combined relevancy score corresponding to the user query. It should be noted that the combined relevancy score is a weighted sum of a semantic score and a keyword score of each of the set of documents corresponding to the user query. The processor-executable instructions, on execution, may further cause the processor to select a set of relevant documents for the user query from the set of documents based on the combined relevancy score and a predefined threshold relevancy score. The processor-executable instructions, on execution, may further cause the processor to create a set of vector indices from the set of relevant documents. It should be noted that each of the set of vector indices may include embeddings based on a plurality of document chunks of a predefined size. The processor-executable instructions, on execution, may further cause the processor to retrieve a set of relevant document chunks from a first vector index based on a similarity analysis between each of the set of vector indices and the user query. It should be noted that the first vector index is one of the set of vector indices. It should also be noted that the predefined size of each of the plurality of document chunks of the first vector index is greater than the predefined size of each of the plurality of document chunks of each of remaining of the set of vector indices.

In yet another embodiment, a non-transitory computer-readable medium storing computer-executable instruction for context retrieval in large dataset using an LLM is disclosed. In one example, the stored instructions, when executed by a processor, may cause the processor to perform operations including receiving, via a user interface, a set of documents and a user query for an LLM. For each of the set of documents, the operations may further include calculating a combined relevancy score corresponding to the user query. It should be noted that the combined relevancy score is a weighted sum of a semantic score and a keyword score of each of the set of documents corresponding to the user query. The operations may further include selecting a set of relevant documents for the user query from the set of documents based on the combined relevancy score and a predefined threshold relevancy score. The operations may further include creating a set of vector indices from the set of relevant documents. It should be noted that each of the set of vector indices may include embeddings based on a plurality of document chunks of a predefined size. The operations may further include retrieving a set of relevant document chunks from a first vector index based on a similarity analysis between each of the set of vector indices and the user query. It should be noted that the first vector index is one of the set of vector indices. It should also be noted that the predefined size of each of the plurality of document chunks of the first vector index is greater than the predefined size of each of the plurality of document chunks of each of remaining of the set of vector indices.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates an exemplary chunk index table representing large size document chunks mapped with corresponding small size document chunks, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
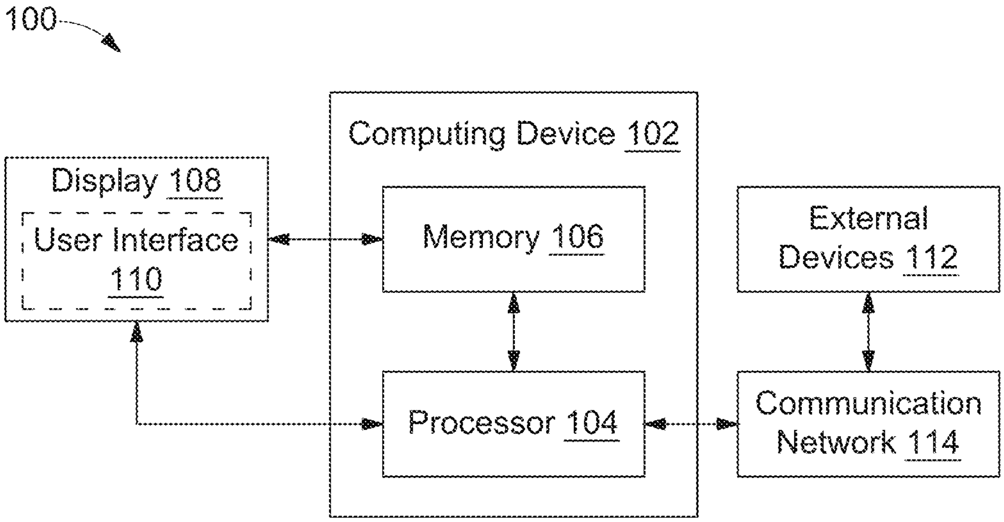
FIG. 1 is a block diagram of an exemplary system for context retrieval in large dataset using a Large Language Model (LLM), in accordance with some embodiments of the present disclosure.

Referring now to FIG. 1, an exemplary system 100 for context retrieval in large dataset using a Large Language Model (LLM) is illustrated, in accordance with some embodiments of the present disclosure. The system 100 may include a computing device 102. The computing device 102 may be, for example, but may not be limited to, server, desktop, laptop, notebook, netbook, tablet, smartphone, mobile phone, or any other computing device, in accordance with some embodiments of the present disclosure. For a user query provided to an LLM, the computing device 102 may select relevant documents from a set of input documents based on a combined relevancy score. Further, the computing device 102 may retrieve relevant document chunks from the relevant documents using a second stage filtering process. Further, the computing device 102 may feed the relevant document chunks to the LLM to obtain a response to the user query with high consistency, precision, and recall.

As will be described in greater detail in conjunction with FIGS. 2-6, the computing device 102 may receive, via a user interface, a set of documents and a user query for an LLM. The computing device 102 may calculate, for each of the set of documents, a combined relevancy score corresponding to the user query. It should be noted that the combined relevancy score is a weighted sum of a semantic score and a keyword score of each of the set of documents corresponding to the user query. The computing device 102 may further select a set of relevant documents for the user query from the set of documents based on the combined relevancy score and a predefined threshold relevancy score. The computing device 102 may further create a set of vector indices from the set of relevant documents. It should be noted that each of the set of vector indices may include embeddings based on a plurality of document chunks of a predefined size. The computing device 102 may further retrieve a set of relevant document chunks from a first vector index based on a similarity analysis between each of the set of vector indices and the user query. It should be noted that the first vector index is one of the set of vector indices. It should also be noted that the predefined size of each of the plurality of document chunks of the first vector index is greater than the predefined size of each of the plurality of document chunks of each of remaining of the set of vector indices.

In some embodiments, the computing device 102 may include one or more processors 104 and a memory 106. Further, the memory 106 may store instructions that, when executed by the one or more processors 104, may cause the one or more processors 104 to retrieve context in large dataset using the LLM, in accordance with aspects of the present disclosure. The memory 106 may also store various data (for example, a set of documents, a set of relevant documents, a plurality of document embeddings, a plurality of user query embeddings, a set of relevant document chunks, a first response generation prompt, a second response generation prompt, and the like) that may be captured, processed, and/or required by the system 100.

The system 100 may further include a display 108. The system 100 may interact with a user interface 110 accessible via the display 108. The system 100 may also include one or more external devices 112. In some embodiments, the computing device 102 may interact with the one or more external devices 112 over a communication network 114 for sending or receiving various data. The communication network 114 may include, for example, but may not be limited to, a wireless fidelity (Wi-Fi) network, a light fidelity (Li-Fi) network, a local area network (LAN), a wide area network (WAN), a metropolitan area network (MAN), a satellite network, the internet, a fiber optic network, a coaxial cable network, an infrared (IR) network, a radio frequency (RF) network, and a combination thereof. The one or more external devices 112 may include, but may not be limited to, a remote server, a laptop, a netbook, a notebook, a smartphone, a mobile phone, a tablet, or any other computing device.

Figure 2:
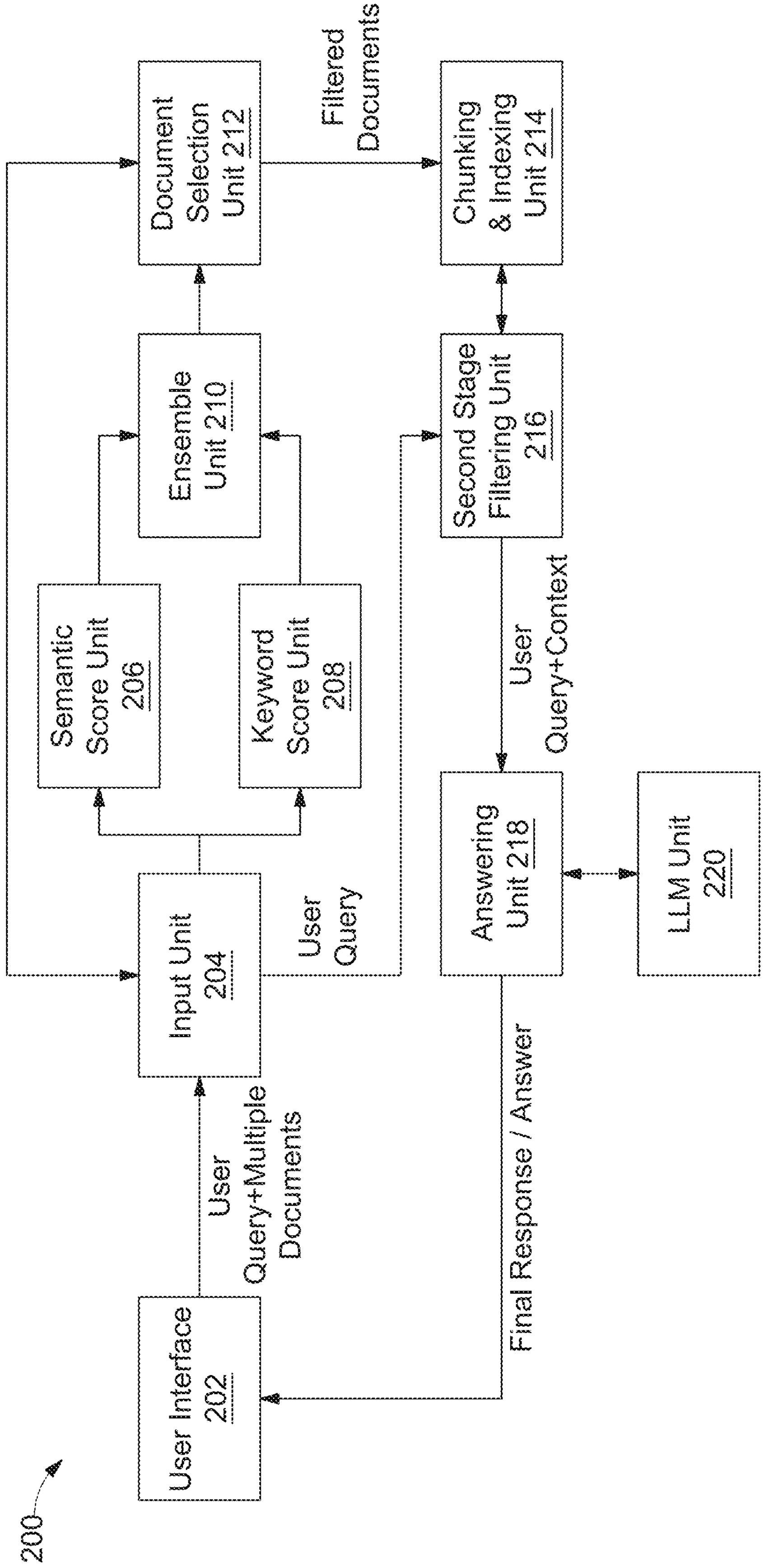
FIG. 2 illustrates a functional block diagram of a system for context retrieval in large dataset using an LLM, in accordance with some embodiments of the present disclosure.

Referring now to FIG. 2, a functional block diagram of a system 200 for context retrieval in large dataset using an LLM is illustrated, in accordance with some embodiments of the present disclosure. FIG. 2 is explained in conjunction with FIG. 1. The system 200 may be analogous to the system 100. The system 200 may implement the computing device 102. The system 200 may include, within the memory 106, a user interface 202, an input unit 204, a semantic score unit 206, a keyword score unit 208, an ensemble unit 210, a document selection unit 212, a chunking and indexing unit 214, a second stage filtering unit 216, an answering unit 218, and an LLM unit 220. The LLM unit 220 may include an LLM. By way of an example, the LLM may be, but may not be limited to, Generative Pre-trained Transformer (GPT)-3, GPT-3.5, GPT-4, Language Model for Dialogue Applications (LaMDA), Pathways Language Model (PaLM), Gemini, Claude, BigScience Large Open-science Open-access Multilingual Language Model (BLOOM), Large Language Model Meta AI (Llama), Mistral 7B, Mixtral 8x7B, Mixtral 8x22B, or the like. It should be noted that the LLM unit 220 may be hosted internally (i.e., within the memory 106) or externally (i.e., on an external server or any other external computing device).

Initially, the input unit 204 may receive, via the user interface 202, a set of documents and a user query for an LLM from a user. The set of documents may include any documents which contain information related to any domain. The domain may be, for example, but may not be limited to, healthcare domain, entertainment domain, finance domain, e-commerce domain, educational domain, or the like. The user query may be any query for which the user wants a response from the LLM. The set of documents may be received in a text or document format, such as, a Portable Document Format (PDF), a word document (DOC, or DOCX), HTML, or the like.

Further, the input unit 204 may generate a unique document ID corresponding to each of the set of documents. The unique document ID may be, for example, but may not be limited to, a numeric value, an alphabetic character, a roman numeral, or an alpha-numeric value. Further, the input unit 204 may store each of the set of documents and the corresponding unique document ID in a database. Additionally, the input unit 204 may provide the set of documents and the corresponding unique document ID to the semantic score unit 206 and the keyword score unit 208. The input unit 204 may also provide the user query to the semantic score unit 206 and the keyword score unit 208 for further processing.

Further, the semantic score unit 206 may create a set of document embeddings corresponding to the set of documents using a sentence transformer model. The sentence transformer model may be, for example, but may not be limited to, all-MiniLM-L6-v2, all-mpnet-base-v2, all-distilroberta-v1, multi-qa-mpnet-base-cose-v1, or the like.

Further, the semantic score unit 206 may create a user query embedding corresponding to the user query using the sentence transformer model. Further, the semantic score unit 206 may calculate the semantic score for each of the set of documents corresponding to the user query based on a similarity analysis of each of the set of document embeddings with the user query embedding using the sentence transformer model. The similarity analysis may be, for example, but may not be limited to, a cosine similarity, a Euclidean distance, a Jaccard index, or the like. Further, the semantic score unit 206 may normalize the semantic score of each of the set of documents to obtain a normalized semantic score. Upon normalizing the semantic score, the semantic score unit 206 may provide the normalized semantic score to the ensemble unit 210.

Additionally, the keyword score unit 208 may compute a keyword count for each of the set of documents based on the user query. Further, the keyword score unit 208 may compute an n-gram count for each of the set of documents based on the user query. The n-gram keyword count corresponds to dynamically obtained phrases from each of the set of documents using a dynamic n-gram technique. The dynamic n-gram technique may be, for example, but may not be limited to, a Laplace smoothing, a Kneser-Ney smoothing, a Katz Backoff, or the like.

Further, the keyword score unit 208 may calculate the keyword score for each of the set of documents based on a weighted sum of the keyword count and the n-gram count. Further, the keyword score unit 208 may normalize the keyword score of each of the set of documents to obtain a normalized keyword score. Further, the keyword score unit 208 may provide the normalized keyword score to the ensemble unit 210. It should be noted that the normalized semantic score and the normalized keyword score may be calculated simultaneously by the semantic score unit 206 and the keyword score unit 208 respectively.

Upon receiving the normalized semantic score and the normalized keyword score, the ensemble unit 210 may calculate a combined relevancy score for each of the set of documents corresponding to the user query using an ensemble technique. It should be noted that the combined relevancy score is a weighted sum of a semantic score and a keyword score of each of the set of documents corresponding to the user query. Further, the ensemble unit 210 may normalize the combined relevancy score to obtain a normalized combined relevancy score. Further, the ensemble unit 210 may provide the normalized combined relevancy score for each of the set of documents to the document selection unit 212.

Further, the document selection unit 212 may select a set of relevant documents for the user query from the set of documents based on the combined relevancy score and a predefined threshold relevancy score. In particular, the document selection unit 212 may compare the normalized combined relevancy score with the predefined threshold relevancy score to obtain (or filter) the unique document IDs above the predefined threshold relevancy score. Further, the document selection unit 212 may provide the filtered unique document IDs to the input unit 204. Further, the input unit 204 may provide the set of relevant documents to the document selection unit 212. The document selection unit 212 may then provide the set of relevant documents to the chunking and indexing unit 214.

Further, the chunking and indexing unit 214 may create a set of vector indices from the set of relevant documents. It should be noted that each of the set of vector indices may include embeddings based on a plurality of document chunks of a predefined size. To create the set of vector indices, the chunking and indexing unit 214 may chunk each of the set of relevant documents into the plurality of document chunks based on the predefined size. By way of an example, the plurality of document chunks may include large sized document chunks (e.g., chunks of 2000-10,000 tokens in size) and small sized document chunks (e.g., chunks of 1000-2000 tokens in size). In some other embodiments, the plurality of document chunks may be of three or more predefined sizes. The embeddings may be generated by the chunking and indexing unit 214 using an embedding model (for example, but not limited to, a sentence transformer model such as "al-MiniLM-L6-v2" model).

Further, each of the plurality of document chunks may be indexed into a set of vector indices based on the associated predefined size. In continuation with the above example, the set of vector indices may include a large chunk index (i.e., 'L-Index' including embeddings of the large sized document chunks), and a small chunk index (i.e., 'S-Index' including embeddings of the small sized document chunks) as per predefined size. It will be apparent that the plurality of document chunks may be indexed into more than two indices.

Further, for each of the set of vector indices, the chunking and indexing unit 214 may assign an ID number (such as, a numeric value, an alphanumeric value, or the like) to each of the plurality of document chunks. In an embodiment, the ID number of a document chunk in the vector index may correspond to a number of the document chunk when the plurality of document chunks is arranged in a sequential order. Upon creating the set of vector indices, the chunking and indexing unit 214 may map one or more of the plurality of document chunks in each of remaining of the set of vector indices with a corresponding document chunk in a first vector index to obtain a mapping of the vector indices. The mapping of the vector indices may include ID numbers of mapped document chunks. In an embodiment, the mapping of the vector indices may be obtained in a tabular format.

The second stage filtering unit 216 may receive the user query via the user interface 202. Further, the second stage filtering unit 216 may send the user query to the chunking and indexing unit 214. The chunking and indexing unit 214 may create a user query embedding from the user query using the embedding model.

For each vector index of the set of vector indices, the chunking and indexing unit 214 may then calculate a cosine similarity score between a user query embedding and an embedding corresponding to each of the plurality of document chunks of the vector index. Further, the chunking and indexing unit 214 may identify a set of document chunks based on the cosine similarity score. In other words, the chunking and indexing unit 214 may match the user query embedding with the embeddings corresponding to each of the plurality of document chunks based on the similarity analysis. The chunking and indexing unit 214 may then send the identified set of document chunks, the associated ID numbers, and the corresponding cosine similarity scores to the second stage filtering unit 216.

In continuation with the above example, the chunking and indexing unit 214 may provide the matching large size document chunks and small size document chunks along with the associated ID numbers (i.e., ID numbers for document chunks of 'L-Index' and ID numbers for document chunks of 'S-Index') corresponding to the user query to the second stage filtering unit 216. Additionally, the chunking and indexing unit 214 may provide the similarity score between the user query embedding and each matching document chunk to the second stage filtering unit 216.

The second stage filtering unit 216 may retain a first set of document chunks (each of a first predefined size) from the set of document chunks obtained from the first vector index. It should be noted that the first vector index is one of the set of vector indices. It should also be noted that the first predefined size is greater than the predefined size of each of the plurality of document chunks of each of remaining of the set of vector indices. In other words, the first vector index includes document chunks of the largest predefined size. Further, for remaining of set of document chunks, the second stage filtering unit 216 may send the ID numbers of the remaining of the set of document chunks to the chunking and indexing unit 214. Further, the chunking and indexing unit 214 may identify a document chunk from the first vector index corresponding to each of remaining of the set of document chunks based on the mapping of the vector indices to obtain the set of relevant document chunks. In other words, smaller sized document chunks relevant to the user query are mapped to large sized document chunks of the first vector index. The chunking and indexing unit 214 may then send the identified document chunk for each of the remaining of the set of document chunks to the second stage filtering unit 216.

In continuation with the above example, the second stage filtering unit 216 may retain all the large size document chunks from the 'L-Index'. Additionally, the second stage filtering unit 216 may send the associated ID numbers of the small size document chunks to the chunking and indexing unit 214. The chunking and indexing unit 214 may identify additional large size document chunk numbers (i.e., ID numbers) corresponding to the associated ID numbers of the small size document chunks. Further, the chunking and indexing unit 214 may obtain additional large size document chunks. Further, the chunking and indexing unit 214 may provide the additional large size document chunks from the 'L-Index' to the second stage filtering unit 216.

The second stage filtering unit 216 may combine the first set of document chunks with the identified document chunk for each of the remaining of the set of document chunks to form the set of relevant document chunks (or final context). Thus, each of the set of relevant document chunks is a document chunk retrieved from the first vector index. As will be appreciated, a document chunk of a larger size provides better context. Advantageously, the set of relevant document chunks enables an approximation of full context when provided to the LLM in a prompt. The approximation of full context may provide more consistency, precision, and recall in LLM responses.

Further, the second stage filtering unit 216 may provide a prompt including the set of relevant document chunks and the user query to the answering unit 218. Further, the LLM unit 220 may generate, via an LLM, a final response to the user query using the prompt.

To generate the final response to the user query, the answering unit 218 may provide, for each relevant document chunk of the set of relevant document chunks, a first response generation prompt to the LLM within the LLM unit 220. The first response generation prompt may include the user query, the relevant document chunk, and a first set of LLM instructions. Thus, an individual response for the user query combined with each individual relevant document chunk may be obtained.

Further, the answering unit 218 may provide a second response generation prompt to the LLM within the LLM unit 220. The second response generation prompt may include the user query, the response (i.e., the individual response) to the first response generation prompt for each of the set of relevant document chunks, and a second set of LLM instructions. Further, the LLM unit 220 may generate, via the LLM, the final response to the user query based on the second response generation prompt. Further, the LLM unit 220 may provide the final response to the answering unit 218. Further, the answering unit 218 may provide the final response to the user interface 202.

It should be noted that all such aforementioned modules 204-220 may be represented as a single module or a combination of different modules. Further, as will be appreciated by those skilled in the art, each of the modules 204-220 may reside, in whole or in parts, on one device or multiple devices in communication with each other. In some embodiments, each of the modules 204-220 may be implemented as dedicated hardware circuit comprising custom application-specific integrated circuit (ASIC) or gate arrays, off-the-shelf semiconductors such as logic chips, transistors, or other discrete components. Each of the modules 204-220 may also be implemented in a programmable hardware device such as a field programmable gate array (FPGA), programmable array logic, programmable logic device, and so forth. Alternatively, each of the modules 204-220 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for context retrieval in large dataset using an LLM. For example, the exemplary system 100 and the associated computing device 102, may perform context retrieval in the large dataset using the LLM, by the processes discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3A:
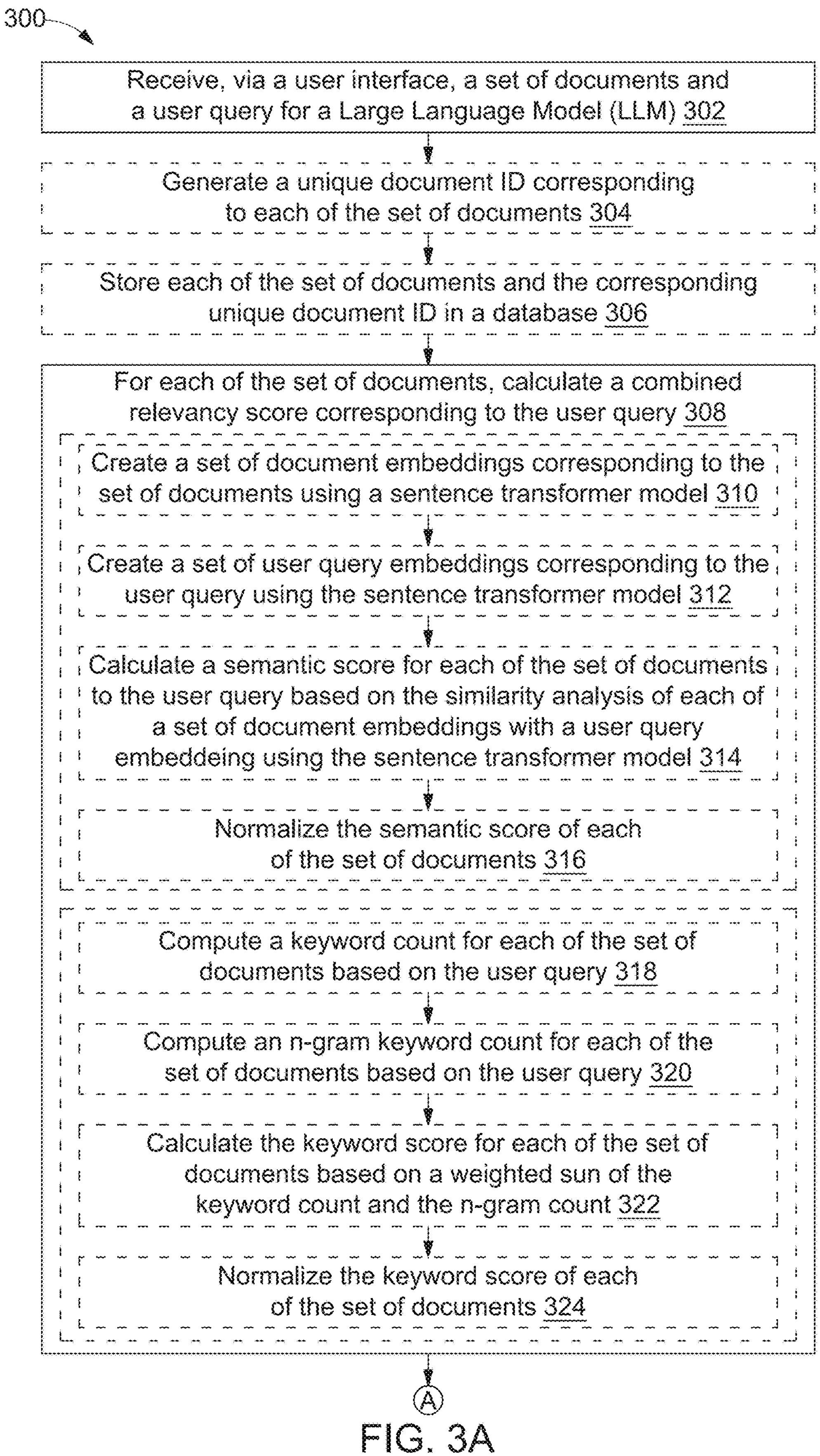
FIGS. 3A, 3B, and 3C illustrate a flow diagram of an exemplary process for context retrieval in large dataset using an LLM, in accordance with some embodiments of the present disclosure.
Figure 3B:
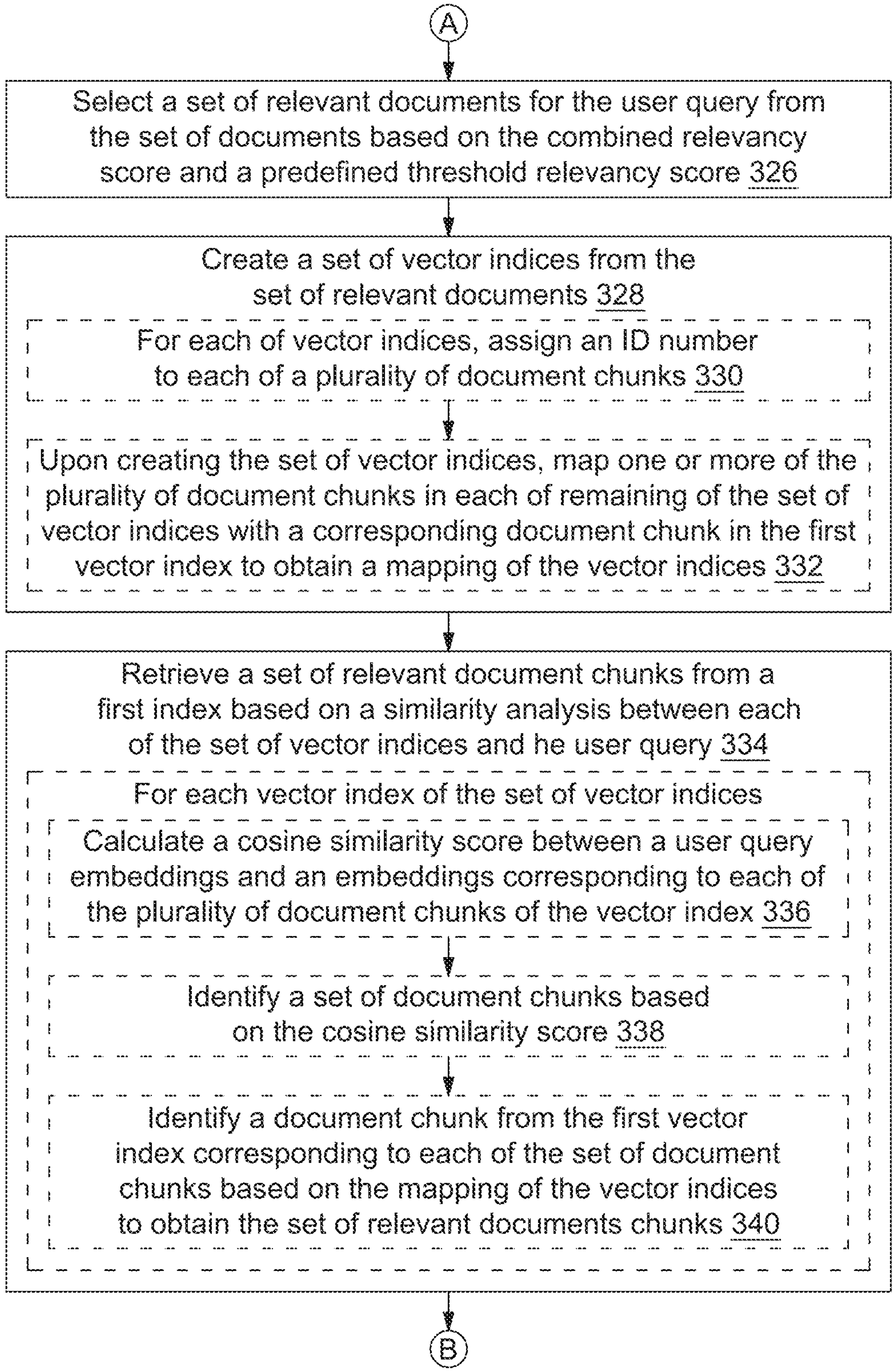
Figure 3C:
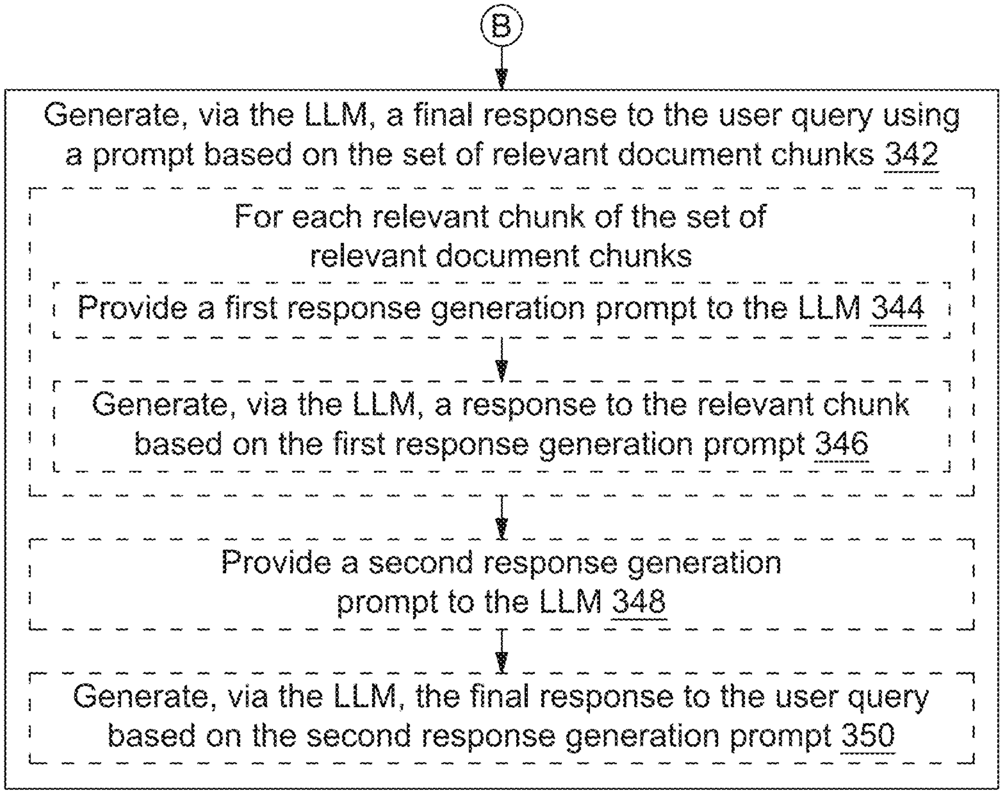

Referring now to FIGS. 3A, 3B, and 3C, an exemplary process 300 for context retrieval in large dataset using an LLM is illustrated via a flow chart, in accordance with some embodiments of the present disclosure. The process 300 may be implemented by the computing device 102 of the system 100. In some embodiments, the process 300 may include receiving, by an input unit (such as the input unit 204) via a user interface (such as the user interface 202), a set of documents and a user query for an LLM, at step 302.

Upon receiving the set of documents and the user query, the process 300 may include generating, by the input unit, a unique document ID corresponding to each of the set of documents, at step 304. Further, the process 300 may include storing, by the input unit, each of the set of documents and the corresponding unique document ID in a database, at step 306. Once the set of documents and the corresponding unique document ID are stored, for each of the set of documents, the process 300 may include calculating, by an ensemble unit (such as the ensemble unit 210), a combined relevancy score corresponding to the user query, at step 308. It should be noted that the combined relevancy score is a weighted sum of a semantic score and a keyword score of each of the set of documents corresponding to the user query. The step 308 may include steps 310, 312, 314, 316, 318, 320, 322, and 324.

To calculate the combined relevancy score, the process 300 may include creating, by a semantic unit (such as the semantic score unit 206), a set of document embeddings corresponding to the set of documents using a sentence transformer model, at step 310. Further, the process 300 may include creating, by the semantic score unit, a user query embedding corresponding to the user query using the sentence transformer model, at step 312. Upon creating the set of document embeddings and the user query embedding, the process 300 may include calculating, by the semantic score unit, the semantic score for each of the set of documents corresponding to the user query based on a similarity analysis of each of the set of document embeddings with the user query embedding using the sentence transformer model, at step 314. Once the semantic score is calculated, the process 300 may include normalizing, by the semantic score unit, the semantic score of each of the set of documents, at step 316.

Additionally, to calculate the combined relevancy score, the process 300 may include computing, by a keyword score unit (such as the keyword score unit 208), a keyword count for each of the set of documents based on the user query, at step 318. Further, the process 300 may include computing, by the keyword score unit, an n-gram keyword count for each of the set of documents based on the user query, at step 320. The n-gram keyword count corresponds to dynamically obtained phrases from each of the set of documents using a dynamic n-gram technique. Upon computing the keyword count and the n-gram keyword count, the process 300 may include calculating, by the keyword score unit, the keyword score for each of the set of documents based on a weighted sum of the keyword count and the n-gram count, at step 322. Once the keyword score is calculated, the process 300 may include normalizing, by the keyword score unit, the keyword score of each of the set of documents, at step 324.

Once the combined relevancy score is calculated, the process 300 may include selecting, by a document selection unit (such as the document selection unit 212), a set of relevant documents for the user query from the set of documents based on the combined relevancy score and a predefined threshold relevancy score, at step 326.

Upon selecting the set of relevant documents, the process 300 may include creating, by a chunking and indexing unit (such as the chunking and indexing unit 214), a set of vector indices from the set of relevant documents, at step 328. It should be noted that each of the set of vector indices may include embeddings based on a plurality of document chunks of a predefined size. The step 328 may include steps 330, and 332.

To create the set of vector indices from the set of relevant documents, the process 300 may include assigning, by the chunking and indexing unit, for each of the set of vector indices, an ID number to each of the plurality of document chunks, at step 330. Upon creating the set of vector indices, the process 300 may include mapping, by the chunking and indexing unit, one or more of the plurality of document chunks in each of remaining of the set of vector indices with a corresponding document chunk in the first vector index to obtain a mapping of the vector indices, at step 332. It should be noted that the mapping of the vector indices may include ID numbers of mapped document chunks.

Once the set of vector indices are created, the process 300 may include retrieving, by a second stage filtering unit (such as the second stage filtering unit 216), a set of relevant document chunks from a first vector index based on a similarity analysis between each of the set of vector indices and the user query, at step 334. The first vector index is one of the set of vector indices. It should be noted that the predefined size of each of the plurality of document chunks of the first vector index is greater than the predefined size of each of the plurality of document chunks of each of remaining of the set of vector indices. The step 334 may include steps 336, 338, and 340.

For each vector index of the set of vector indices, the process 300 may include calculating, by the second stage filtering unit, a cosine similarity score between a user query embedding and an embedding corresponding to each of the plurality of document chunks of the vector index, at step 336. Upon calculating the similarity score, the process 300 may include identifying, by the second stage filtering unit, a set of document chunks based on the cosine similarity score, at step 338. Upon identifying the set of document chunks, the process 300 may include identifying, by the second stage filtering unit, a document chunk from the first vector index corresponding to each of the set of document chunks based on the mapping of the vector indices to obtain the set of relevant document chunks, at step 340.

Upon identifying the set of relevant document chunks, the process 300 may include generating, by an LLM unit (such as the LLM unit 220) via an LLM, a final response to the user query using a prompt based on the set of relevant document chunks, at step 342. The step 342 may include steps 344, 346, 348, and 350.

To generate the final response to the user query, the process 300 may include providing, by an answering unit (such as the answering unit 218), for each relevant chunk of the set of relevant document chunks, a first response generation prompt to the LLM, at step 344. The first response generation prompt may include the user query, the relevant chunk, and a first set of LLM instructions. Upon receiving the first response generation prompt, the process 300 may include generating, by the LLM unit via the LLM, a response to the relevant chunk based on the first response generation prompt, at step 346.

Once the response to the relevant chunk is generated, the process 300 may include providing, by the answering unit, a second response generation prompt to the LLM, at step 348. The second response generation prompt may include the user query, the response to the first response generation prompt for each of the set of relevant document chunks, and a second set of LLM instructions. Upon receiving the second response generation prompt, the process 300 may include generating, by the LLM unit via the LLM, the final response to the user query based on the second response generation prompt, at step 350.

Figure 4:
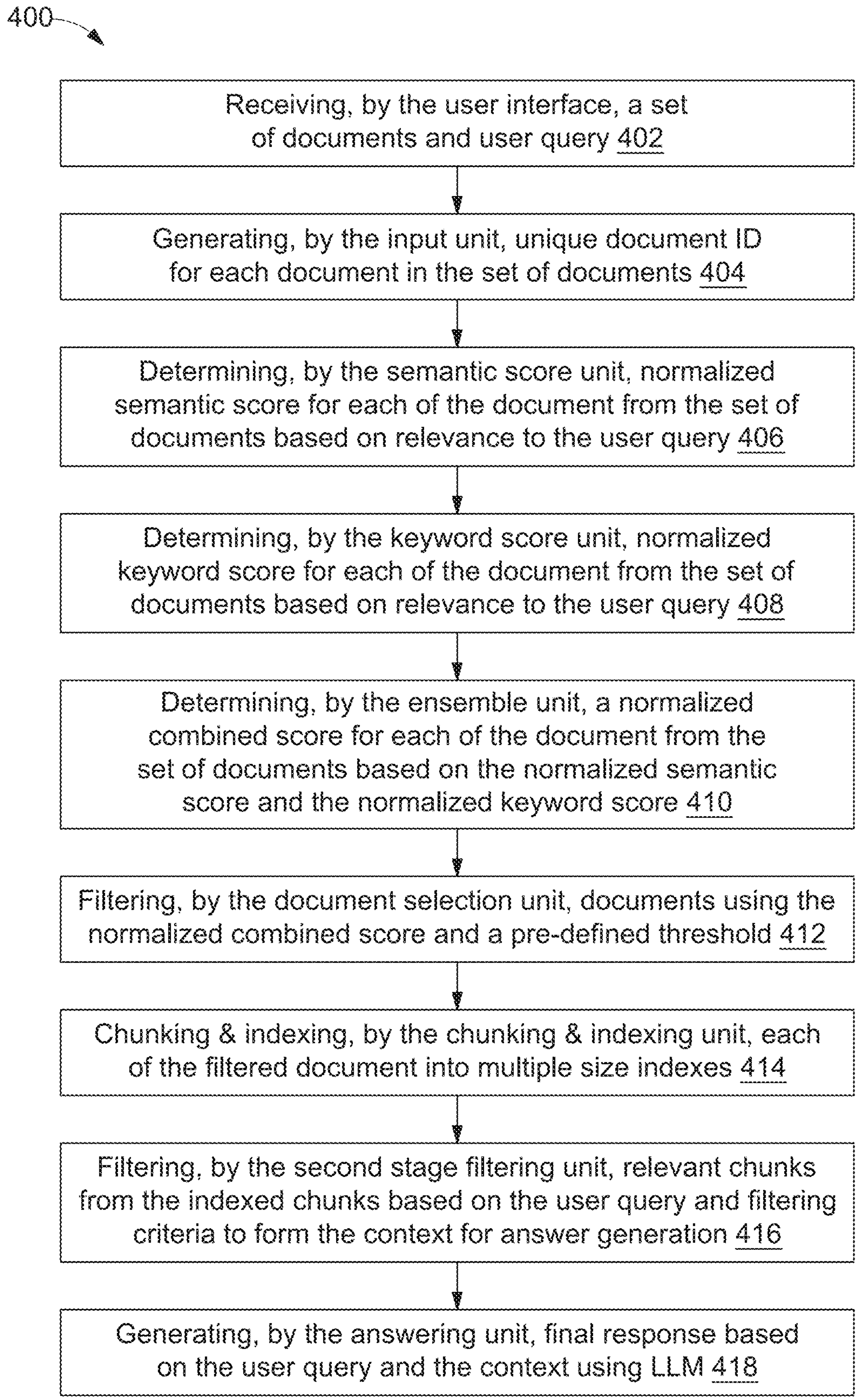
FIG. 4 illustrates a flow diagram of a detailed exemplary process for context retrieval in large dataset using an LLM, in accordance with some embodiments of the present disclosure.

Referring now to FIG. 4, a detailed exemplary process 400 for context retrieval in large dataset using an LLM is illustrated via a flow chart, in accordance with some embodiments of the present disclosure. The process 400 may be implemented by the computing device 102 of the system 100. FIG. 4 is explained in conjunction with FIGS. 2 and 3A-C. In an embodiment, the process 400 may be implemented in two stages, i.e., a document routing stage and a second filtering stage. The document routing stage may be a key optimization that may enable the system 100 to efficiently focus on only the most relevant documents when a user query is provided. Instead of processing the entire corpus of documents, the routing mechanism may narrow the scope by identifying a small subset of documents that are most likely to contain the information required to answer the user query. This selective focus may significantly reduce the number of tokens processed (in subsequent steps), improving computational efficiency and enabling the system 100 to scale effectively across large datasets. By filtering out irrelevant documents upfront, the system 100 may reduce unnecessary token processing, making it faster and more resource efficient. By focusing only on the most relevant documents, the system 100 may optimize the performance and may speed up the retrieval times. The document routing stage may use a combination of methods that may ensure that both a semantic meaning and a keyword relevance are accounted for leading to more robust document retrieval.

For the document routing stage, the process 400 may include receiving, by the user interface 202, a set of documents and a user query, at step 402. A user may provide the set of documents through the user interface 202. Additionally, the user may provide the user query via the user interface 202 to generate a final response (or answer) from the set of documents. For example, the set of documents may be received in a PDF format. Further, the user interface 202 may provide the set of documents and the user query to the input unit 204.

Upon receiving the set of documents and the user query, the process 400 may include generating, by the input unit 204, a unique document ID (e.g., a numeric value) for each document of the set of documents, at step 404. Once the unique document IDs are generated, the input unit 204 may store each of the set of documents and the corresponding unique document ID in a database. Additionally, the input unit 204 may provide the set of documents along with the unique document ID for each document and the user query to the semantic score unit 206 and the keyword score unit 208.

Once the set of documents and the corresponding unique document ID are received, the process 400 may include determining, by the semantic score unit 206, a normalized semantic score for each document of the set of documents based on a relevance to the user query, at step 406. The semantic score unit 206 may determine the relevance between each document of the set of documents and the user query using a sentence transformer model (e.g., all-MiniLM-L6-v2). The sentence transformer model may capture the semantic meaning at a sentence level.

The sentence transformer model may compute a similarity analysis between the user query embedding and the set of document embeddings corresponding to each of the set of documents based on a contextual meaning of the entire sentence rather than individual keywords. This may help in capturing the intent and the context of the user query properly and may also find relevant sections of text in documents that may not share exact keyword matches but are still highly relevant semantically. By applying the sentence transformer-based embeddings, it may ensure that even shorter documents (or documents with complex and nuanced language) may be effectively processed.

To calculate the normalized semantic score, initially, the sentence transformer model may fetch the important words from the set of documents and remove unnecessary words having least importance using a Natural Language Processing (NLP) technique (e.g., lemmatization & stop words removal). By way of an example, the stop words removal may eliminate the words, such as, 'a', 'the', 'is', 'was', 'as', 'to', or the like from the documents. The lemmatization may reduce words to their base (or dictionary form). By way of an example, the lemmatization may reduce a word 'running' to 'run'.

Further, the sentence transformer model may create a set of document embeddings corresponding to the set of documents. Additionally, the sentence transformer model may create a user query embedding corresponding to the user query. Upon creating the set of document embeddings and the user query embedding, the sentence transformer model may compute a cosine similarity (i.e., pytorch_cos_sim) between the user query embedding and each of the set of document embeddings. Further, the sentence transformer model may compute (or calculate) a semantic score between the user query and each document of the set of documents using the cosine similarity.

Upon computing the semantic score for each document, the semantic score for each document may be multiplied with '100' and divided by a maximum semantic score to obtain the normalized semantic score between the user query and each document of the set of documents. Further, the sentence transformer model may provide the normalized semantic score for each document along with the unique document ID to the ensemble unit 210.

Further, the process 400 may include determined, by the keyword score unit 208, a normalized keyword score for each document of the set of documents based on a relevance to the user query, at step 408. The keyword score unit 208 may determine the relevance between each document of the set of documents and the user query using a dynamic n-gram keyword matching model. The dynamic n-gram keyword matching model may be used to determine key phrases (or words) from each of the set of documents. The dynamic n-gram keyword matching model may capture the context at a more granular level. By way of an example, the documents may include word pairs (or triplets), contextual phrases, or the like that may be crucial for document relevance. By using dynamic n-grams, the word pairs (or triplets), contextual phrases from documents may also be captured easily.

Keyword extraction may be used alongside embeddings to capture important terms that may be hidden in less obvious places within the text. The dynamic n-gram keyword matching model may calculate a keyword score for each document based on the match of the key phrases and words in that document with their match to the user query's keywords.

To calculate the normalized keyword score, initially, the dynamic n-gram keyword matching model may fetch the important words in the full content using a Natural Language Processing (NLP) technique (e.g., a lemmatization & stop words removal). Additionally, the dynamic n-gram keyword matching model may remove the unnecessary words having the least importance. The dynamic n-gram keyword matching model may use another NLP technique (e.g., a dynamic n-gram technique) that may automatically select the best fit (e.g., a unigram, a bigram, a trigram, or the like) based on the available content or context or requirement of the task.

The dynamic n-gram keyword matching model may generate dynamic n-gram keywords of varying lengths for each of the set of documents. Further, for keyword score calculation, input may include a corpus text. The corpus text may include each of the set of documents, the user query (keywords) and the dynamic n-gram keywords. Upon receiving the input, the dynamic n-gram keyword matching model may check the keywords present in the user query with the corpus text (i.e. each of the set of documents). Further, the occurrence of keywords in each document may be counted to obtain a keyword count between the user query and each set of documents.

Similarly, the keywords present in the user query may be iterated through the dynamic n-gram keywords for each document. Then, the occurrence of keywords in the dynamic n-grams of the document may be counted to obtain a n-gram count between the user query and each document. Upon obtaining the keyword count and the n-gram count, the dynamic n-gram keyword matching model may assign a weightage to the keyword count and the n-gram count.

By way of an example, more weightage (e.g., '0.8') may be assigned to the n-gram count, and less weightage (e.g., '0.2') may be assigned to the keyword count to obtain the keyword score for each document of the set of documents. Upon obtaining the keyword score, the dynamic n-gram keyword matching model may multiply the keyword score with '100' and then divide it by a maximum keyword score to get the normalized keyword score between the user query and each document. Further, the dynamic n-gram keyword matching model may provide the normalized keyword score for each document along with the document IDs to the ensemble unit 210.

Upon obtaining the normalized semantic score and the normalized keyword score, the process 400 may include determining, by the ensemble unit 210, a normalized combined relevancy score for each document of the set of documents based on the normalized semantic score and the normalized keyword score, at step 410. To determine the normalized combined relevancy score, the ensemble unit 210 may combine the normalized semantic score and the normalized keyword score for each document using the unique document ID via a scoring technique through the weighted contribution to arrive at a final score (i.e., the normalized combined relevancy score) for each document.

Each component (i.e. the normalized semantic score, and the normalized keyword score) may signify a different aspect of document relevance. Thus, these scores may be combined using a weighted voting system to determine which documents to retrieve. Additionally, an ensemble of multiple scoring techniques may also be used to determine the final score for each document.

By way of an example, the combined relevancy score may be obtained using below mentioned formula.

$$\text{Combined Score} = (\text{alpha} * \text{normalized\_keyword\_score}) + ((1 - \text{alpha}) * \text{normalized\_semantic\_score})$$

It should be noted that the value of alpha may be predefined (or obtained after performing trial and error approaches). The value of alpha may be adjusted based on the importance of different components for the specific query, ensuring that the routing system is highly adaptive and contextually aware. This result may help in more accurate document selection and ensures that the system may effectively handle complex queries and diverse document types.

By way of an example, the value of alpha may be '0.4', the normalized keyword score for that document may be 'normalized_keyword_score', and the normalized semantic score for the same document may be 'normalized_semantic_score'.

Further, the obtained combined relevancy score for each document of the set of documents may be divided by a maximum combined score to obtain the normalized combined relevancy score for each document of the set of documents. The normalized combined relevancy score for each document may represent the relevance of that document to the user query. Further, the ensemble unit 210 may provide the normalized combined relevancy score for each document along with the corresponding unique document ID to the document selection unit 212.

Once the normalized combined relevancy score is obtained, the process 400 may include filtering, by the document selection unit 212, a set of relevant documents from the set of documents using the normalized combined relevancy score and a predefined threshold relevancy score, at step 412. To filter the set of relevant documents, the document selection unit 212 may compare the normalized combined relevancy score with the pre-defined threshold relevancy score to filter out a relevant unique document IDs.

By way of an example, if the pre-defined-threshold relevancy score may be '0.5', the unique document IDs that may have a normalized combined score of greater than '0.5' may be selected. Further, the document selection unit 212 may provide the relevant unique document IDs to the input unit 204. Upon receiving the relevant unique document IDs, the input unit 204 may retrieve the filtered documents (analogous to the set of relevant documents) using the corresponding relevant unique document IDs. Upon retrieving, the input unit 204 may provide the filtered documents to the document selection unit 212. Further, the document selection unit 212 may provide the filtered documents to the chunking and indexing unit 214.

It should be noted that while the document routing stage may help in reducing the number of documents to process, individual documents selected by the document routing stage may still be very large, often containing thousands of tokens. To manage this, the second-stage filtering approach is applied using an ensemble of vector indexes built in memory, for example using the Facebook AI Similarity Search (FAISS) library. This may allow for the creation of fast, scalable vector indexes, which may be used to break down the large documents into smaller, more manageable chunks while preserving context and relevance. This approach may also provide scalability by reducing the number of tokens processed at each stage, while still ensuring the retrieval of high-quality, contextually rich information.

The combination of document routing and second-stage filtering makes it possible to handle large datasets efficiently, without overloading the system 100 with excessive token processing. Furthermore, the filtering process may be parallelized, speeding up retrieval times and enabling real-time performance, even for large-scale applications.

By focusing on the set of relevant documents, filtering them into manageable chunks, and maintaining high levels of context continuity, this may ensure that the system 100 may scale to handle vast collections of information while minimizing computational overhead. This makes the system 100 ideal for real-time applications that require consistent, precise, and coherent information retrieval, even from large or complex datasets.

For the second stage filtering, the process 400 may include chunking and indexing, by the chunking and indexing unit 214, each of the filtered documents into multiple size vector indexes (analogous to the set of vector indices), at step 414. The chunking and indexing unit 214 may chunk each of the filtered documents into a plurality of document chunks of multiple sizes (two or more). Further, each of the plurality of document chunks may be indexed into different indexes as per their size.

By way of an example, each of the filtered documents may be chunked into large size chunks as well as small size chunks. Further, for each size chunk (i.e., the large size chunks and the small size chunks) two separate vector indexes (e.g., a Large Chunk Index, and a Small Chunk Index) may be created respectively. The Large Chunk Index may be represented as 'L-Index'. Similarly, the Small Chunk Index may be represented as 'S-Index'.

In continuous with the above example, firstly, each of the filtered documents may be chunked into large size chunks of text to capture the overall essence of a document (i.e., the filtered documents). For example, the large size chunks may include '2K' to '10K' tokens, where 'K' may correspond to '1000'. By way of an example, the filtered documents may be chunked first into the large size document chunks to ensure that broad themes and key information may be retained, especially for documents that require a general understanding of their content. The L-Index may be composed of the large size document chunks of text and help to maintain the context of larger sections of the filtered documents.

Further, in addition to the large size document chunks, each of the filtered documents may be chunked (or divided) into small size document chunks to capture sentence-level relevance. For example, the small size document chunks may include '1K' tokens. In some embodiments, the large size document chunks may sometime omit key details, where the small size chunks may allow for a finer-grained focus on specific sentences (or concepts), which may be crucial for more precise queries. This is further explained in greater detail in conjunction with FIG. 5.

Further, the chunking and indexing unit 214 may create overlapping document chunks to ensure the continuity and coherence between adjacent sections. The overlapping may help to maintain the flow of ideas across document sections and may also prevent the important context from being lost during the chunking process. Additionally, the overlapping may ensure that connections between different parts of the document may be preserved, which is especially important for maintaining the integrity of complex (or multi-step arguments).

Upon creating the multiple vector indexes, the chunking and indexing unit 214 may store the multiple vector indexes in the database. The multiple vector indexes may ensure that only the most relevant contextual chunks may be selected for further processing. Additionally, the multiple vector indexes may allow fast retrieval of a set of relevant document chunks that may be most pertinent (or similar) to the user query. The concept of in-memory chunks may help to optimize how the documents may be processed, especially for the large-scale documents that contain rich information but are too large to fit into the model's memory window. It should be noted that the number of chunk levels and their sizes may be pre-defined (or controlled as hyperparameters), and the vector indexes may be created based on the number of chunks. Further, chunking and indexing unit 214 may provide the multiple vector indexes to the second stage filtering unit 216.

Upon receiving the vector indexes, the process 400 may include filtering, by the second stage filtering unit 216, the set of relevant document chunks from the indexed chunks based on the user query and filtering criteria to form context for answer generation, at step 416. The second stage filtering may ensure that, even with the large documents, only the most relevant and coherent document chunks (analogous to the set of document chunks) may be selected for further processing. The second stage filtering may be used to build a large, coherent context (for example, ranging from '100K' to '200K' tokens) that may be efficiently processed by the In-Memory Full Context Retrieval (IFCR) system.

To retrieve the set of relevant document chunks, the second stage filtering unit 216 may send the user query to the chunking and indexing unit 214. The user query may be received from the input unit 204. Upon receiving the user query, the chunking and indexing unit 214 may create the plurality of user query embeddings corresponding to the user query. Further, the chunking and indexing unit 214 may calculate a cosine similarity score between the user query embeddings and an embedding corresponding to each the large size chunks and the small size chunks corresponding to each vector indexes using a cosine similarity.

Upon calculating the cosine similarity score, the chunking and indexing unit 214 may retrieve the matched large size document chunks and the small size document chunks to the user query. Additionally, the chunking and indexing unit 214 may retrieve the index number (i.e., the 'L-Index', and the 'S-Index') corresponding to the matched large size document chunks and the small size document chunks. Further, the chunking and indexing unit 214 may provide the matched large size document chunks and the small size document chunks along with the corresponding index number to the second stage filtering unit 216. Optionally, the chunking and indexing unit 214 may provide the cosine similarity score to the second stage filtering unit 216.

By way of an example, an exemplary large size document chunks and small size document chunks in response to the user query may be retrieved by the chunking and indexing unit 214 as mentioned below.

For large size document chunks, a document chunk with a chunk number '3', a document chunk with a chunk number '7', and a document chunk with a chunk number '12' may be retrieved from the 'L-Index'.

For small size document chunks, a document chunk with a chunk number '20', a document chunk with a chunk number '25', and a document chunk with a chunk number '135' may be retrieved from the 'S-Index'.

Further, the second stage filtering unit 216 may retain and store each of the matched large size document chunks in the database for further processing. Further, for each small size document chunk, the chunk numbers from the 'S-Index' may be used to determine the corresponding large size chunk numbers from the 'L-index' in which they lie using an algorithm as mentioned below.

By way of an example, for the 'L-Index' and the 'S-Index', a chunk size of the 'L-index' may be 'm', and a chunk size of the 'S-index'; may be 'n'. To calculate a factor, the 'm' may be divided by the 'n' (i.e., "factor=m/n"). By way of an example, if 'm' may be '10K', and 'n' may be '1K'. Then, the factor may be (10/1)='10'.

In an embodiment, if '(k mod factor)' (or remainder when k is divided by factor) is not equal to 0, then the large size chunk number from L-Index, 'l', may be calculated using the equation (1).

$$l = \text{floor}(k/\text{factor}) + 1 \tag{1}$$

Alternatively, if '(k mod factor)' (or remainder when k is divided by factor) is equal to 0, then the large size chunk number from L-Index, 'l', may be calculated using the equation (2).

$$l = \text{floor}(k/\text{factor}) \tag{2}$$

In the above-mentioned formulas (1) and (2), 'k' corresponds to the received chunk number from the 'S-Index' and 'l' corresponds to the corresponding determined large size chunk number from the 'L-Index', the factor='m/n', and floor corresponds to greatest integer function.

Upon determining the set of large size chunk numbers from the 'L-Index' corresponding to the small size chunk numbers from the 'S-Index', the second stage filtering unit 216 may remove the large size chunk numbers which may already be retrieved priorly and may only use the remaining large size chunk numbers from the 'L-Index' for further processing.

Further, the second stage filtering unit 216 may send the remaining large size chunk numbers from the 'L-Index' to the chunking and indexing unit 214 to retrieve all such large size chunks from the 'L-Index'. Upon retrieving the large size chunks corresponding to the remaining large size chunk numbers, the chunking and indexing unit 214 may send the remaining large size chunk to the second stage filtering unit 216. Further, the second stage filtering unit 216 may combine the previously retrieved large size document chunks and the newly retrieved large size document chunks together to form a final context (i.e., the set of relevant document chunks) for answer retrieval.

In continuation with the above example, using the above-mentioned formula (2), the large size chunk number 'l' from the 'L-Index' may be determined corresponding to the small size chunk numbers 'k' from the 'S-Index'. For example, the small size chunks with the chunk number '20', '25' and '135' may be found in the large size chunks with the chunk number '2', '3', and '14' respectively.

By way of an example, consider, the large size chunk number '3' from the 'L-Index' may be already retrieved in the large size chunks, in such case, the large size chunk number '3' may be removed from further processing. On the other hand, the remaining large size chunk numbers (i.e., '2' and '14') may be processed for further processing. Further, the document chunks corresponding to the large size chunk numbers (i.e., '2' and '14') may be retrieved from the chunking and indexing unit 214 and added to the chunks for the large size chunk numbers '3', '7', and '12'. Thus, the final context may include the document chunks from the large chunk numbers of the 'L-Index', such as, '2', '3', '7', '12' and '14'.

In some embodiments, there may be a pre-defined threshold size of the context (e.g., 200K tokens or any other size) that may be built from the retrieved large size chunks. In such scenario, the number of small size chunks from the 'S-Index' that may be retrieved in response to the user query may be set at a little higher value than the number of large size chunks from the 'L-Index'. Further, the retrieved small size chunks may be sorted based on their similarity score (i.e., priorly received from the chunking and indexing unit 214) with the user query.

Further, the second stage filtering unit 216 may provide the final context (i.e. all the large size chunks) to the answering unit 218 along with the user query. Upon receiving the final context, the process 400 may include generating, by the answering unit 218, a final response based on the user query and the final context using the LLM, at step 418. If the full context (i.e. the tokens retrieved from the second stage filtering unit 216) may be processed within the available context window of the LLM, then the context may be used in its entirety. Otherwise, the system 100 may send the document chunks to fit within the LLM's context window, to ensure the context remains comprehensive while adhering to the model's memory limitations.

To generate the final response to the user query, the answering unit 218 may send, for each relevant chunk of the set of relevant document chunks, a first response generation prompt to the LLM within the LLM unit 220. The first response generation prompt may include the user query, the relevant chunks, and a first set of LLM instructions. The answering unit 218 may send the first response generation prompt for each relevant chunks of the set of relevant document chunks either one-by-one or simultaneously to the LLM.

Upon receiving the first response generation prompt, the LLM may generate a response to each relevant chunk of the set of relevant document chunks based on the first response generation prompt. Further, the LLM may send the response corresponding to each of the set of relevant document chunks to the answering unit 218. Further, answering unit 218 may collate (or arrange) the response corresponding to each of the relevant chunks and store it in the database.

Further, the answering unit 218 may provide a second response generation prompt to the LLM within the LLM unit 220. The second response generation prompt may include, the user query, the response to the first response generation prompt for each of the set of relevant document chunks, and a second set of LLM instructions. Further, the LLM may generate the final response to the user query based on the second response generation prompt. Further, the LLM may provide the final response to the answering unit 218. Further, the answering unit 218 may provide the final response to the user interface 202.

Referring now to FIG. 5, an exemplary chunk index table 500 representing large size document chunks mapped with small size document chunks is illustrated, in accordance with some embodiment of the present disclosure. FIG. 5 is explained in conjunction with FIGS. 2-4. The chunk index table 500 may be correspond to a mapping of the vector indices. The chunking and indexing unit 214 may chunk each of the filtered documents into a plurality of document chunks. Further, each of the plurality of document chunks may be indexed into different indices based on their sizes. This is already explained in greater detail in conjunction with FIG. 4. For ease of explanation only one filtered document may be used from here on as an example.

Initially, the chunking and indexing unit 214 may chunk the filtered document (e.g., contains '30K' tokens) into three large size document chunks (e.g., each containing '10K' tokens). Further, the chunking and indexing unit 214 may assign an ID number to each of the three large size document chunks. For example, the ID number 'chunk 1' may be assigned to the first large size document chunk. Similarly, the ID number 'chunk 2' may be assigned to the second large size document chunk and the ID number 'chunk 3' may be assigned to the third large size document chunk.

Additionally, the chunking and indexing unit 214 may chunk the same filtered document into thirty small size document chunks (e.g., each contain '1K' tokens). In the same manner, the chunking and indexing unit 214 may assign the ID number to each of the ten small size document chunks. For example, the ID number 'chunk 1' may be assigned to the first small size document chunk, the ID number 'chunk 2' may be assigned to the second small size document chunk, the ID number 'chunk 3' may be assigned to the third small size document chunk. In the same manner, remaining small size document chunks may also be assigned the ID numbers.

Once the large and small size document chunks are created, each of the large and small size document chunks may be indexed into two different indices (i.e., an L-Index 502, and an S-Index 504). The 'L-Index' 502 may include all three large size document chunks (i.e., 'chunk 1', 'chunk 2', and 'chunk 3'). The 'S-Index' 504 may include all small size chunks (i.e., 'chunk 1', 'chunk 2', 'chunk 3', upto 'chunk 30').

Further, the chunking and indexing unit 214 may map each of the small size document chunks with the corresponding large size document chunks using a cosine similarity. In an embodiment, each of the large size document chunks may contain '10K' sized tokens and each of the small size document chunks may contain '1K' sized tokens. Then the tokens covered by 'chunk 1' to 'chunk 10' from the S-Index 504 in continuity may cover the same tokens covered by the 'chunk 1' from the 'L-Index' 502. In other words, the tokens included in the first document chunk from the 'L-Index' 502 may be the same as the tokens included in the first 10 document chunks from the 'S-Index' 504.

By way of an example, in the chunk index table 500, the first 10 small size document chunks (i.e., 'chunk 1' 'chunk 2', 'chunk 3', upto 'chunk 10') may be mapped with the large size document chunk (i.e., 'chunk 1'). In the same manner, the next 10 small size document chunks (i.e., 'chunk 11' 'chunk 12', 'chunk 13', upto 'chunk 20') and the remaining small size document chunks (i.e., 'chunk 21' 'chunk 22', 'chunk 23', upto 'chunk 30') may be mapped with the large size document chunk 'chunk 2', and 'chunk 3' respectively.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
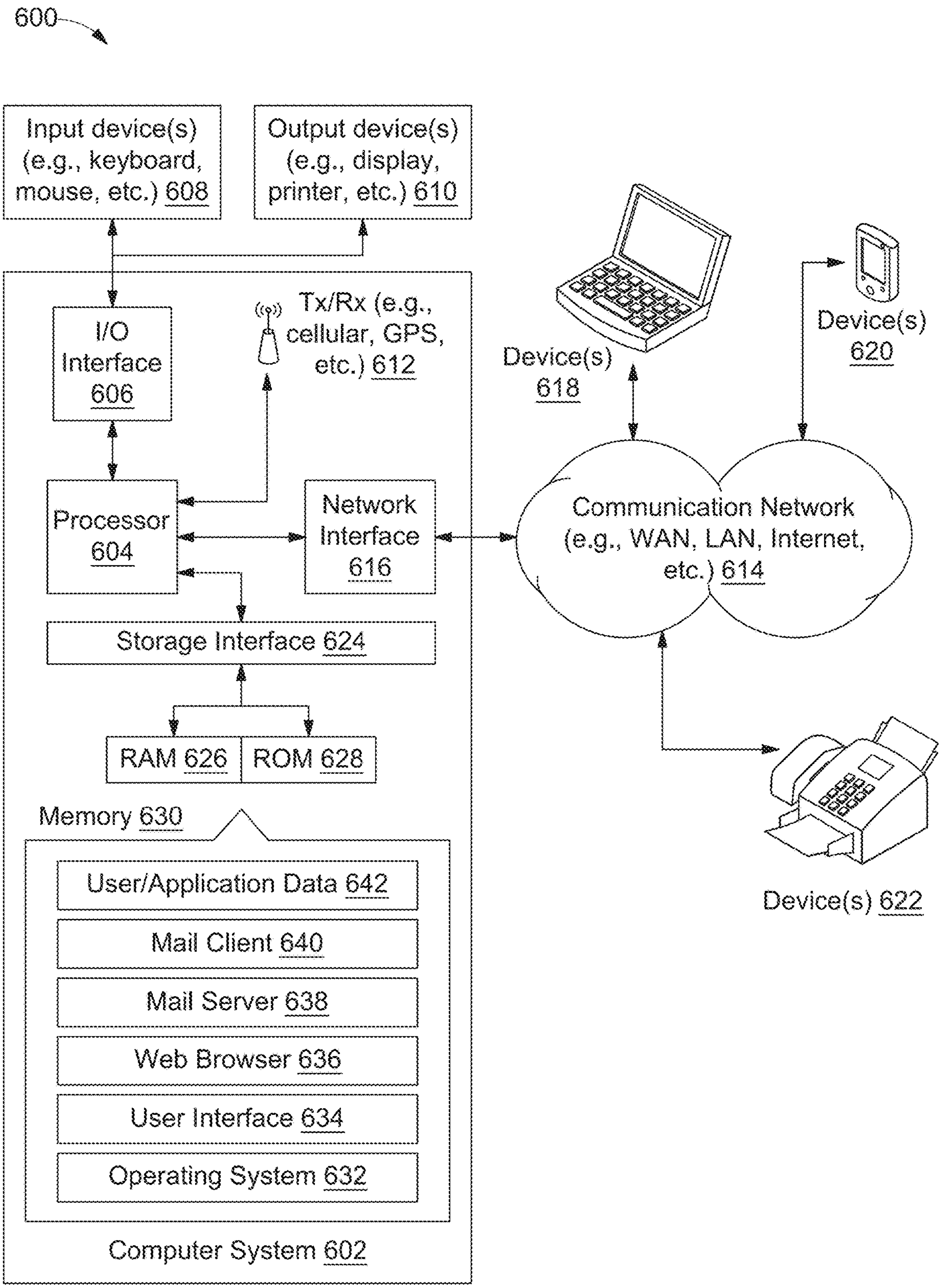
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 602 for implementing embodiments consistent with the present disclosure is illustrated. Variations of computer system 602 may be used for implementing system 600 for context retrieval in large dataset using an LLM. The computer system 602 may include a central processing unit ("CPU" or "processor") 604. The processor 604 may include at least one data processor for executing program components for executing user-generated or system-generated requests. A user may include a person, a person using a device such as such as those included in this disclosure, or such a device itself. The processor 604 may include specialized processing units such as integrated system (bus) controllers, memory management control units, floating point units, graphics processing units, digital signal processing units, etc. The processor 604 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 604 may be disposed in communication with one or more input/output (I/O) devices via I/O interface 606. The I/O interface 606 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 602.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 606, the computer system 602 may communicate with one or more I/O devices. For example, the input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with the processor 604. The transceiver may facilitate various types of wireless transmission or reception. For example, the transceiver may include an antenna operatively connected to a transceiver chip (e.g., TEXAS INSTRUMENTS® WILINK WL1286©, BROADCOM® BCM45501UB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 604 may be disposed in communication with a communication network 616 via a network interface 614. The network interface 614 may communicate with the communication network 616. The network interface may employ connection protocols including, without limitation, direct connect, Ethernet (e.g., twisted pair 10/100/1000 Base T), transmission control protocol/internet protocol (TCP/IP), token ring, IEEE 602.11a/b/g/n/x, etc. The communication network 616 may include, without limitation, a direct interconnection, local area network (LAN), wide area network (WAN), wireless network (e.g., using Wireless Application Protocol), the Internet, etc. Using the network interface 614 and the communication network 616, the computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 602 may itself embody one or more of these devices.

In some embodiments, the processor 604 may be disposed in communication with one or more memory devices 630 (e.g., RAM 626, ROM 628, etc.) via a storage interface 624. The storage interface may connect to memory devices 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 630 may store a collection of program or database components, including, without limitation, an operating system 632, user interface application 634, web browser 636, mail server 638, mail client 640, user/application data 642 (e.g., any data variables or data records discussed in this disclosure), etc. The operating system 632 may facilitate resource management and operation of the computer system 602. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 634 may facilitate display, execution, interaction, manipulation, or operation of program components through textual or graphical facilities. For example, user interfaces may provide computer interaction interface elements on a display system operatively connected to the computer system 602, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 602 may implement a web browser 636 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 602 may implement a mail server 638 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 602 may implement a mail client 640 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 602 may store user/application data 642, such as the data, variables, records, etc. (e.g., a set of documents, a user query, a plurality of document embeddings, a plurality of user query embeddings, a relevant set of documents, a plurality of document chunks, a set of relevant document chunks, and the like) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Various embodiments provide method and system for context retrieval in large dataset using a Large Language Model (LLM). The disclosed method and system may receive, via a user interface, a set of documents and a user query for an LLM. Further, the disclosed method and system may calculate, for each of the set of documents, a combined relevancy score corresponding to the user query. The combined relevancy score is a weighted sum of a semantic score and a keyword score of each of the set of documents corresponding to the user query. Further, the disclosed method and system may select a set of relevant documents for the user query from the set of documents based on the combined relevancy score and a predefined threshold relevancy score. Moreover, the disclosed method and system may create a set of vector indices from the set of relevant documents. Each of the set of vector indices may include embeddings based on a plurality of document chunks of a predefined size. Thereafter, the disclosed method and system may retrieve a set of relevant document chunks from a first vector index based on a similarity analysis between each of the set of vector indices and the user query. The first vector index is one of the set of vector indices. The predefined size of each of the plurality of document chunks of the first vector index is greater than the predefined size of each of the plurality of document chunks of each of remaining of the set of vector indices.

Thus, the disclosed method and system try to overcome the technical problem of context retrieval in large dataset using an LLM. The disclosed method and system may improve consistency and stability. For example, by splitting an external set of documents into large, manageable chunks (e.g., 40-50K tokens or any other size) that may fit into the LLM's context window. Additionally, the disclosed method and system may ensure that the LLM has access to larger, richer contexts for the retrieval. This may enable the LLM to directly retrieve relevant content from the entire context, rather than relying on a separate retrieval process that may introduce stochasticity. As the LLM views the entire context, it is better equipped to produce consistent and accurate outputs. Further, the disclosed method and system may reduce the randomness inherent in the traditional Retrieval Augmented Generation (RAG) pipeline and may ensure that even with slight variations in input, the generated responses may be more predictable and stable.

Further, the disclosed method and system may utilize the large dataset in a more accurate manner by leveraging the LLM's ability to handle long contexts, International Control over Financial Reporting (IFCR) makes it possible to process entire documents, preserving semantic coherence across large swaths of text. This approach may take advantage of conditional activations (as seen in Mixture of Experts (MoE)) and long-range dependencies available in most LLMs to generate high-quality outputs. By iterating over the document in manageable chunks and retrieving content relevant to the user's query, the LLM is able to generate a response that may integrate the most pertinent (or relevant) information from the entire document, rather than relying on potentially incomplete or irrelevant chunks retrieved through the traditional RAG methods.

Further, the disclosed method and system may provide a stochasticity reduction. The retrieval process in the IFCR is designed to be deterministic by allowing the LLM to access the full context of the document and make more informed decisions. The LLM may directly pull the relevant information from the entire document rather than relying on a separate retrieval system that may retrieve different chunks based on the same query. This may reduce the stochasticity and may ensure that the model may generate more coherent and precise outputs, which is crucial for applications that demand high consistency.

Further, the disclosed method and system may provide parallelization for scalability and efficiency. This approach may involve processing large volumes of data, it is designed to be scalable through parallelization. The retrieval of relevant chunks from the set of documents may be done concurrently. This may significantly improve the performance and ensure that the IFCR may handle large datasets in real-time scenarios.

Further, the disclosed method and system may cost effective, practically consistent, and easy to use. Although IFCR may be computationally expensive due to the large context windows and the need to process all tokens in the document. However, the disclosed method and system may introduce two optimization techniques to make it practical and scalable for real-world use cases. Additionally, the disclosed method and system optimize the chunk size by intelligently choosing the optimal chunk size based on the LLM's context window. Also, the IFCR may ensure that only the relevant portions of the document may be processed. This may improve efficiency without compromising the quality of the generated output. Further, the disclosed method and system may provide parallel processing. For example, the retrieval and synthesis process may be processed parallelly to increase throughput. This makes the disclosed method and system viable for more demanding applications.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for context retrieval in large dataset using a Large Language Model (LLM), the method comprising:

receiving, by a computing device via a user interface, a set of documents and a user query for a Large Language Model (LLM);

for each of the set of documents, calculating, by the computing device, a combined relevancy score corresponding to the user query, wherein the combined relevancy score is a weighted sum of a semantic score and a keyword score of each of the set of documents corresponding to the user query, wherein calculating the combined relevancy score comprises:

creating, by the computing device, a set of document embeddings corresponding to the set of documents using a sentence transformer model;

creating, by the computing device, a user query embedding corresponding to the user query using the sentence transformer model;

calculating, by the computing device, the semantic score for each of the set of documents corresponding to the user query based on the similarity analysis of each of the set of document embeddings with the user query embedding using the sentence transformer model; and normalizing, by the computing device, the semantic score of each of the set of documents;

computing, by the computing device, a keyword count for each of the set of documents based on the user query;

computing, by the computing device, an n-gram keyword count for each of the set of documents based on the user query, wherein the n-gram keyword count corresponds to dynamically obtained phrases from each of the set of documents using a dynamic n-gram technique;

calculating, by the computing device, the keyword score for each of the set of documents based on a weighted sum of the keyword count and the n-gram count; and normalizing, by the computing device, the keyword score of each of the set of documents;

selecting, by the computing device, a set of relevant documents for the user query from the set of documents based on the combined relevancy score and a predefined threshold relevancy score;

creating, by the computing device, a set of vector indices from the set of relevant documents, wherein each of the set of vector indices comprises embeddings based on a plurality of document chunks of a predefined size;

retrieving, by the computing device, a set of relevant document chunks from a first vector index based on a similarity analysis between each of the set of vector indices and the user query, wherein the first vector index is one of the set of vector indices, and wherein the predefined size of each of the plurality of document chunks of the first vector index is greater than the predefined size of each of the plurality of document chunks of each of remaining of the set of vector indices; and generating, by the computing device via the LLM, a final response to the user query using a prompt based on the set of relevant document chunks, wherein generating the final response to the user query comprises:

for each relevant chunk of the set of relevant document chunks, providing, by the computing device, a first response generation prompt to the LLM, wherein the first response generation prompt comprises the user query, the relevant chunk, and a first set of LLM instructions; and generating, by the computing device via the LLM, a response to the relevant chunk based on the first response generation prompt.

2. The method of claim 1, wherein generating the final response to the user query comprises:

providing, by the computing device, a second response generation prompt to the LLM, wherein the second response generation prompt comprises the user query, the response to the first response generation prompt for each of the set of relevant document chunks, and a second set of LLM instructions; and generating, by the computing device via the LLM, the final response to the user query based on the second response generation prompt.

3. The method of claim 1, further comprising:

generating, by the computing device, a unique document ID corresponding to each of the set of documents; and storing, by the computing device, each of the set of documents and the corresponding unique document ID in a database.

4. The method of claim 1, wherein creating the set of vector indices from the set of relevant documents comprises:

for each of the set of vector indices, assigning, by the computing device, an ID number to each of the plurality of document chunks; and upon creating the set of vector indices, mapping, by the computing device, one or more of the plurality of document chunks in each of remaining of the set of vector indices with a corresponding document chunk in the first vector index to obtain a mapping of the vector indices, wherein the mapping of the vector indices comprises ID numbers of mapped document chunks.

5. The method of claim 4, wherein retrieving the set of relevant document chunks from the first vector index comprises:

for each vector index of the set of vector indices, calculating, by the computing device, a cosine similarity score between a user query embedding and an embedding corresponding to each of the plurality of document chunks of the vector index;

identifying, by the computing device, a set of document chunks based on the cosine similarity score; and identifying, by the computing device, a document chunk from the first vector index corresponding to each of the set of document chunks based on the mapping of the vector indices to obtain the set of relevant document chunks.

6. A system for context retrieval in large dataset using an LLM, the system comprising:

a processor; and a memory communicatively coupled to the processor, wherein the memory stores processor executable instructions, which, on execution, causes the processor to:

receive, via a user interface, a set of documents and a user query for a Large Language Model (LLM);

for each of the set of documents, calculate a combined relevancy score corresponding to the user query, wherein the combined relevancy score is a weighted sum of a semantic score and a keyword score of each of the set of documents corresponding to the user query, wherein for calculating the combined relevancy score the processor executable instructions further cause the processor to:

create a set of document embeddings corresponding to the set of documents using a sentence transformer model;

create a user query embedding corresponding to the user query using the sentence transformer model;

calculate the semantic score for each of the set of documents corresponding to the user query based on the similarity analysis of each of the set of document embeddings with the user query embedding using the sentence transformer model; and normalize the semantic score of each of the set of documents;

compute a keyword count for each of the set of documents based on the user query;

compute an n-gram keyword count for each of the set of documents based on the user query, wherein the n-gram keyword count corresponds to dynamically obtained phrases from each of the set of documents using a dynamic n-gram technique;

calculate the keyword score for each of the set of documents based on a weighted sum of the keyword count and the n-gram count; and normalize the keyword score of each of the set of documents;

select a set of relevant documents for the user query from the set of documents based on the combined relevancy score and a predefined threshold relevancy score;

create a set of vector indices from the set of relevant documents, wherein each of the set of vector indices comprises embeddings based on a plurality of document chunks of a predefined size;

retrieve a set of relevant document chunks from a first vector index based on a similarity analysis between each of the set of vector indices and the user query, wherein the first vector index is one of the set of vector indices, and wherein the predefined size of each of the plurality of document chunks of the first vector index is greater than the predefined size of each of the plurality of document chunks of each of remaining of the set of vector indices; and generate a final response to the user query using a prompt based on the set of relevant document chunks, wherein generating the final response to the user query comprises:

for each relevant chunk of the set of relevant document chunks, providing a first response generation prompt to the LLM, wherein the first response generation prompt comprises the user query, the relevant chunk, and a first set of LLM instructions; and generating a response to the relevant chunk based on the first response generation prompt.

7. The system of claim 6, wherein generating the final response to the user query, the processor executable instructions further cause the processor to:

provide a second response generation prompt to the LLM, wherein the second response generation prompt comprises the user query, the response to the first response generation prompt for each of the set of relevant document chunks, and a second set of LLM instructions; and generate, via the LLM, the final response to the user query based on the second response generation prompt.

8. The system of claim 6, wherein the processor executable instructions further cause the processor to:

generate a unique document ID corresponding to each of the set of documents; and store each of the set of documents and the corresponding unique document ID in a database.

9. The system of claim 6, wherein creating the set of vector indices from the set of relevant documents, the processor executable instructions further cause the processor to:

for each of the set of vector indices, assign an ID number to each of the plurality of document chunks; and upon creating the set of vector indices, map one or more of the plurality of document chunks in each of remaining of the set of vector indices with a corresponding document chunk in the first vector index to obtain a mapping of the vector indices, wherein the mapping of the vector indices comprises ID numbers of mapped document chunks.

10. The system of claim 9, wherein retrieving the set of relevant document chunks from the first vector index, the processor executable instructions further cause the processor to:

for each vector index of the set of vector indices, calculate a cosine similarity score between a user query embedding and an embedding corresponding to each of the plurality of document chunks of the vector index;

identify a set of document chunks based on the cosine similarity score; and identify a document chunk from the first vector index corresponding to each of the set of document chunks based on the mapping of the vector indices to obtain the set of relevant document chunks.

11. A non-transitory computer-readable medium storing computer-executable instructions for context retrieval in large dataset using an LLM, the computer-executable instructions configured for:

receiving, via a user interface, a set of documents and a user query for a Large Language Model (LLM);

for each of the set of documents, calculating a combined relevancy score corresponding to the user query, wherein the combined relevancy score is a weighted sum of a semantic score and a keyword score of each of the set of documents corresponding to the user query, wherein calculating the combined relevancy score comprises:

creating a set of document embeddings corresponding to the set of documents using a sentence transformer model;

creating a user query embedding corresponding to the user query using the sentence transformer model;

calculating the semantic score for each of the set of documents corresponding to the user query based on the similarity analysis of each of the set of document embeddings with the user query embedding using the sentence transformer model; and normalizing the semantic score of each of the set of documents;

computing a keyword count for each of the set of documents based on the user query;

computing an n-gram keyword count for each of the set of documents based on the user query, wherein the n-gram keyword count corresponds to dynamically obtained phrases from each of the set of documents using a dynamic n-gram technique;

calculating the keyword score for each of the set of documents based on a weighted sum of the keyword count and the n-gram count; and normalizing the keyword score of each of the set of documents;

selecting a set of relevant documents for the user query from the set of documents based on the combined relevancy score and a predefined threshold relevancy score;

creating a set of vector indices from the set of relevant documents, wherein each of the set of vector indices comprises embeddings based on a plurality of document chunks of a predefined size;

retrieving a set of relevant document chunks from a first vector index based on a similarity analysis between each of the set of vector indices and the user query, wherein the first vector index is one of the set of vector indices, and wherein the predefined size of each of the plurality of document chunks of the first vector index is greater than the predefined size of each of the plurality of document chunks of each of remaining of the set of vector indices; and generating a final response to the user query using a prompt based on the set of relevant document chunks, wherein generating the final response to the user query comprises:

for each relevant chunk of the set of relevant document chunks, providing a first response generation prompt to the LLM, wherein the first response generation prompt comprises the user query, the relevant chunk, and a first set of LLM instructions; and generating a response to the relevant chunk based on the first response generation prompt.

12. The non-transitory computer-readable medium of claim 11, wherein generating the final response to the user query, the computer-executable instructions are further configured for:

providing a second response generation prompt to the LLM, wherein the second response generation prompt comprises the user query, the response to the first response generation prompt for each of the set of relevant document chunks, and a second set of LLM instructions; and generating, via the LLM, the final response to the user query based on the second response generation prompt.

13. The non-transitory computer-readable medium of claim 11, wherein the computer-executable instructions are further configured for:

generating a unique document ID corresponding to each of the set of documents; and storing each of the set of documents and the corresponding unique document ID in a database.

* * * * *